Feb. 13, 1962 H. R. WENGEN 3,021,381
CABLE SPREADER
Filed Dec. 28, 1960
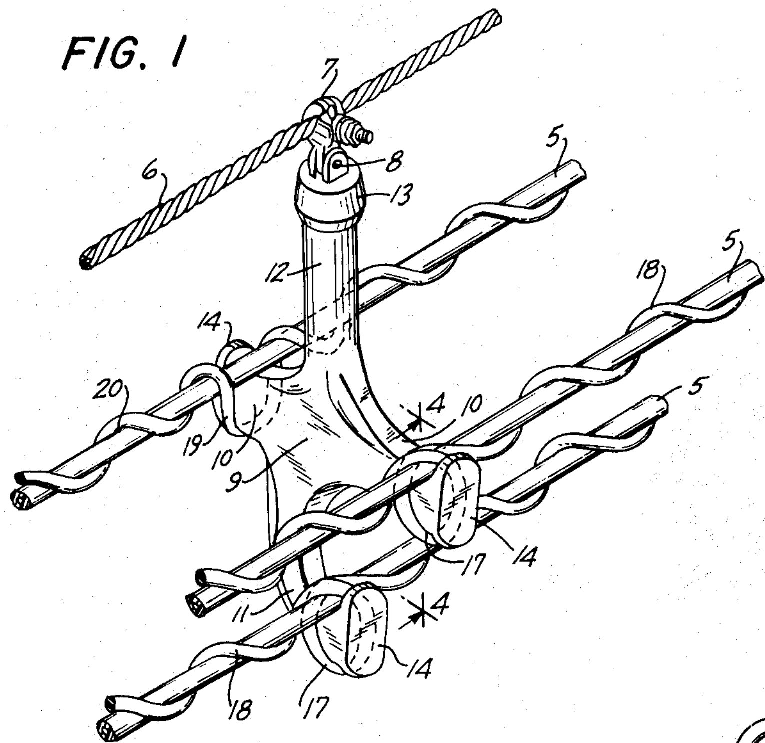
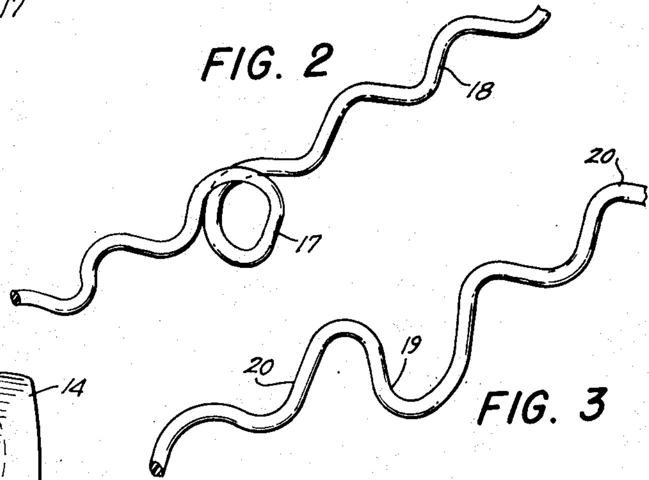
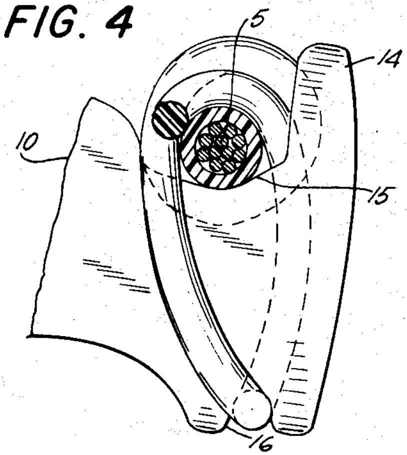
INVENTOR
HENRY R. WENGEN
BY Kane, Dalsimer & Kane
ATTORNEYS United States Patent Office 3,021,381
Patented Feb. 13, 1962

3,021,381
CABLE SPREADER

Henry R. Wengen, Poughkeepsie, N.Y., assignor to Fargo Mfg. Company, Inc., Poughkeepsie, N.Y., a corporation of New York Filed Dec. 28, 1960, Ser. No. 79,018
5 Claims. (Cl. 174—146)

This invention relates to a structurally and functionally improved spreader for use in connection with electrical cables to maintain them in separated condition such that there will be no danger of the cables contacting each other even when they involve a long span and high wind conditions are encountered.

An object of the invention is that of providing a structure which may readily be positioned and applied by a linesman and which will properly support and separate the cables without strain and regardless of whether they extend in downwardly or upwardly inclined directions or are substantially level.

Another object is that of providing an assembly which may be economically manufactured and which when cooperating with cables will maintain its position with respect to the same free from any danger of accidental and undesired movements.

Moreover the unit will have a long life and be capable of accommodating various diameters of cables in manners such that wear of insulation will be minimized.

With these and other objects in mind reference is had to the attached sheet of drawings illustrating one practical embodiment of the invention and in which:

FIG. 1 is a perspective view of a fragment of a cable assembly and showing the spreader applied thereto;

FIG. 2 shows one form of retainer for association with the spreader;

FIG. 3 is a similar perspective view of an alternative form of retainer, and

FIG. 4 is a fragmentary sectional view in enlarged scale taken along the line 4—4 in the direction of the arrows as indicated in FIG.1.

Referring primarily to that figure, the numeral 5 indicates cables for the transmission of electrical energy and 6 a messenger cable which serves to support the spreader. This support according to the present invention preferably involves the use of a suitable clamp structure 7 applied to the messenger cable and secured against movement with respect thereto. Also, it involves a swivel 8 which will permit rocking movement of the supported spreader in a direction substantially parallel to the direction in which the cables 5 and 6 extend. By means of such a structure the body of the spreader may always lie perpendicular to the horizontal regardless of whether the cables are level or inclined. As is obvious, this will minimize strains even when the cables extend in uphill or downhill directions at substantial angles to the horizontal and despite the fact that the individual cables may involve relatively long spans presenting substantial weight factors.

The spreader includes a body 9 from the sides of which a pair of arms 10 extend outwardly in opposite directions. These arms should be a substantially equal length. A downwardly extending arm 11 is also provided as part of the body. Additionally, integral with that body is an upwardly projecting stem 12 which conveniently terminates in a head portion 13 suitably secured to the lower part of the swivel assembly 8. The body and its associated parts are preferably formed of porcelain.

The outer ends of each of arms 10 and 11 terminate in enlarged head portions 14. The upper surfaces of the arms adjacent these portions are formed with V-shaped notches 15 conveniently of shallow configuration such that a number of different sized cables may be accommodated therein with those cables having a two point contact bearing or surface-engagement with the faces of the notch. This is preferred to a round bearing surface in that it reduces wear to which the cable insulation is subjected. Adjacent the head portion of each arm and in line with the over-lying notch 15 a groove or notch 16 is formed. This receives a cable retainer which may take one of several different forms. The head 14 defines the outer face of notch 15 as well as 16.

Attention is directed to FIGS. 2 and 3 in which two forms of retainer have been illustrated. Both are preferably constructed of rigid polyvinyl chloride although various other materials having adequate dielectric characteristics may be employed. As in FIG. 2, the retainer may include a centrally looped portion 17 embracing a complete circle and having opposite end portions 18 disposed in the form of coils. As in FIG. 3, the retainer may include a central loop portion 19 of generally U-shaped configuration and having opposite ends 20 also in the form of coils such as 18. These types of structure may be produced preferably by extrusion to furnish a rod which is then coiled around a mandrel assembly by a suitable machine. The retainers may be produced in three different sizes for use with a given spreader and these sizes will be characterized by coils 18 or 20 in each instance defining internal diameters or bore zones which are less than the diameter of cables to be yieldingly gripped by the inner edge surfaces of the coils.

In FIG. 1 the near arm 10 and lower arm 11 have applied to them retainers of the character shown in FIG. 2 while the far side arm 10 has applied to it a retainer of the type shown in FIG. 3.

It is to be observed that in the case of either loop 17 or 19 it provides what might be termed a stirrup portion extending within the groove with coils encircling the adjacent portions of the cables to retain them within the notches and also to prevent relative longitudinal movement of the same with respect to the spreader body. As is apparent in the form of retainer shown in FIG. 2, the ends extend in opposed directions after providing the loop or circle 17. In the case of the structure shown in FIG. 3 the loop provides merely an intermediate part in the length of the retainer.

In many instances an aerial cable assembly will involve a generally triangular outline as defined by the several cables. This is shown in FIG. 1. As is also apparent in that view, the supporting area or notch 15 of the lower arm 11 is substantially in line with the axis of stem 12. Therefore, with arms 10 being of substantially equal length a balanced structure is presented. Accordingly, even under conditions of maximum strain a straight pull in a downward direction will be transmitted to the stem 12. This will further counteract any tendency of the cables to displace as would be the case if the assembly were out of balance.

It will be clear that with the messenger wire or cable 6 in proper position and the spreader secured thereto at the desired point or points, the linesman will simply be confronted with associating the cables therewith. If retainers of the type shown in FIG. 2 are employed, then those retainers are applied to the spreader arms prior to the cables being received thereby. In the instance of the structure shown in FIG. 3 the cable is first positioned within its notch arm. Thereafter, the operator will simply flex the resilient end portions 18 or 20 and swing their ends in a rotary direction to cause the coils of the retainers to encircle the cables as shown in FIG. 1. When released, it will be found that the retainers tightly grip the cables. Obviously, should it ever become necessary to dismount the spreader, this may readily be accomplished by simply reversing the coiling action.

Thus, among others the several objects of the invention as specifically aforenoted are achieved. Obviously numerous changes in construction and rearrangements of the parts may be resorted to without departing from the spirit of the invention as defined by the claims.

I claim:

1. A spreader assembly including in combination: a spreader body, an arm having its inner end connected to said body and extending laterally therefrom, an enlarged head at the outer end of said arm, a cable extending across the upper surface of said arm, a single retainer of dielectric material, preformed coiled end portions included in said retainer, a preformed loop also forming a part of said retainer intermediate said coiled portions, said loop extending in contact with the lower edge surface of said arm and having a height such that said coiled end portions extend in line with the upper surface of said arm, said retainer being flexible to an extent such that the ends thereof are rotatable around said cable to encircle and grip the latter with its coiled end portions and thus prevent axial cable movement while the retainer is secured against displacement with respect to said arm solely by having its loop portion bearing against the lower surface of said arm.

2. In an assembly as defined in claim 1, the upper surface of said arm presenting a V-shaped notch and said cable lying within and being secured against displacement from said notch by the loop of said retainer.

3. In an assembly as defined in claim 1, said arm in both its upper and lower surfaces being formed with notches, said head defining the outer faces of said notches, a stirrup portion included in said loop and having a height substantially equal to that of said arm, and said stirrup portion bearing against the face of the notch formed in the lower arm surface.

4. For use in a combination as defined in claim 1, further arms extending laterally from said spreader body, one of said arms projecting in a direction substantially opposite the arm recited therein, a second further arm projecting from said body at a zone intermediate said one arm and said recited arm, and enlarged head portions at the outer ends of both of said further arms.

5. In a spreader body as defined in claim 4, a stem extending upwardly therefrom, a clamp and means providing a pivotal connection between the upper end of said stem and clamp.

References Cited in the file of this patent

UNITED STATES PATENTS

| | | |
|---|---|---|
| 1,813,863 | Nightingale | July 7, 1931 |
| 2,421,286 | Pyle | May 27, 1947 |
| 2,820,083 | Hendrix | Jan. 14, 1958 |
| 2,839,597 | Hendrix | June 17, 1958 |